United States Patent [19]

Warner et al.

[11] Patent Number: 5,095,997
[45] Date of Patent: Mar. 17, 1992

[54] FLOATING TRACK ERASERS

[75] Inventors: Steven D. Warner, Caldonia, Wis.; Nolan L. House, Hinsdale, Ill.

[73] Assignee: Case Corporation, Racine, Wis.

[21] Appl. No.: 573,614

[22] Filed: Aug. 27, 1990

[51] Int. Cl.$^5$ .............................................. A01B 37/00
[52] U.S. Cl. .................................... 172/134; 172/676; 172/502
[58] Field of Search ............... 172/676, 134, 502, 662, 172/671, 674, 614, 255, 127

[56] References Cited

U.S. PATENT DOCUMENTS

| | | | |
|---|---|---|---|
| 2,179,793 | 11/1939 | Lewison | 172/134 |
| 2,319,899 | 5/1943 | Silver | 172/134 |
| 2,333,881 | 11/1943 | Phillips | 172/502 X |
| 3,306,368 | 2/1967 | Rosenvold | 172/502 X |
| 4,193,456 | 3/1980 | Ankemman | 172/676 X |
| 4,228,861 | 10/1980 | Hart | 172/676 X |
| 4,262,752 | 4/1981 | Parish | 172/676 X |
| 4,308,921 | 1/1982 | Davis | 172/676 X |

FOREIGN PATENT DOCUMENTS

| | | | |
|---|---|---|---|
| 1015255 | 9/1952 | France | 172/676 |
| 545277 | 4/1975 | U.S.S.R. | 172/134 |

OTHER PUBLICATIONS

"Tracker" Brochure, Lee Welding Co., Oct. 1979 Folding Track Scratcher, Lee Blacksmith, Inc., Jan. 1981.

*Primary Examiner*—Randolph A. Reese
*Assistant Examiner*—Jeffrey L. Thompson
*Attorney, Agent, or Firm*—Dykema Gossett

[57] ABSTRACT

A system for uniformly erasing soil indentations made by the wheels of agricultural equipment. The erasing elements are pulled behind the wheels of the agricultural equipment and are pivotally attached to the frame thereof thereby preventing the relative distance between the frame and the soil from affecting the depth of penetration of the erasing elements. The eraser elements are arranged such that they engage the soil behind the wheels of the equipment and penetrate the indentations to a depth which is largely determined by the weight of the eraser arm assembly, the consistency of the soil and the forces experienced by the erasing arm as it engages the soil. Accordingly, the cutting depth of the eraser arms are largely unaffected by the unevenness of the terrain. A structure is presented for lifting the eraser system from the soil so that the system may be transported to and from the location of use.

12 Claims, 3 Drawing Sheets

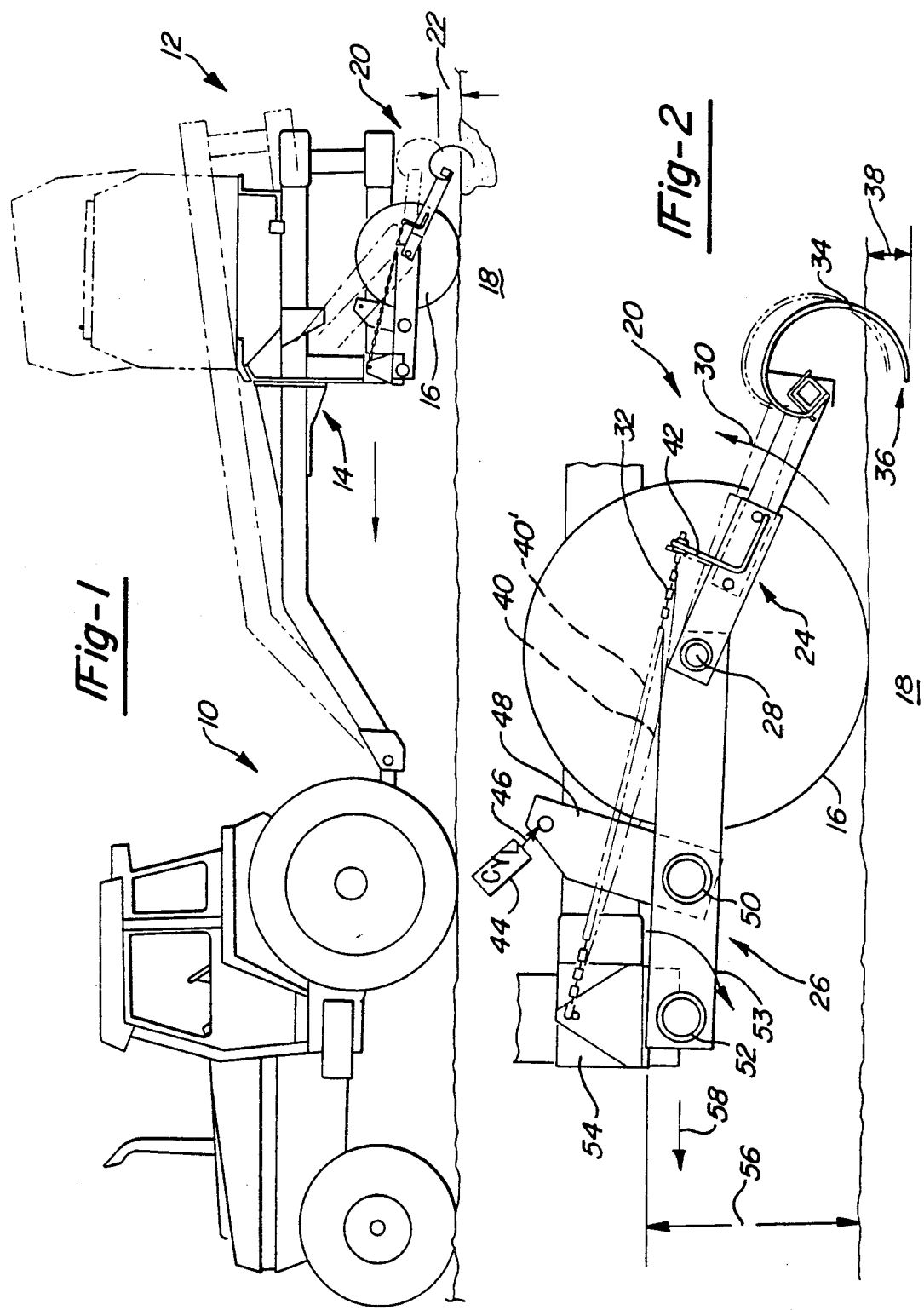

FLOATING TRACK ERASERS

TECHNICAL FIELD

The present invention relates to agricultural equipment and deals more specifically with a device for removing the indentations placed in soil by the tires of agricultural equipment.

BACKGROUND OF THE INVENTION

Agricultural equipment such as seeders and the like commonly employ devices for removing the indentations left in the soil by the equipment's wheels as it passes through the field. Because these devices are used to eliminate the tracks left by the equipment they are commonly known as track erasers.

Track erasers typically employ one or more rake fingers which are attached to the equipment frame and are disposed behind the equipment's tires for engaging the soil which has been compacted by the vehicles tires. Prior art track erasers are typically bolted directly to the equipment's frame and, accordingly, are forced by the equipment frame into the ground. This arrangement works satisfactorily when the equipment is used on relatively flat fields; however, when this system is used on uneven surfaces the track erasers tend to dig too deep as the equipment's tires pass over indentation and likewise, tend to run too shallow as the tires of the equipment pass over a ridge.

Accordingly, it is an object of this invention to make a track eraser which acts upon a vehicle track uniformly, regardless of the contour of the land.

It is a feature of this invention to allow the track erasers to "float" by allowing them to freely pivot as they are pulled through the soil.

It is an advantage of this invention that when the track erasers are allowed to float, they are not forced into the ground, but engage the soil to a predetermined depth, which is independent of the vehicle to ground height and primarily dictated by forces which permit a uniform consistency of soil penetration.

SUMMARY OF THE INVENTION

Accordingly, the present invention provides a system for erasing soil indentations made by agricultural equipment. The system comprises a hinge and an eraser arm. The hinge is attached between the equipment and a first end of the eraser arm and allows the eraser arm to pivot in a substantially horizontal plane. The eraser arm has a second end adapted to be pulled behind the equipment and engage in the soil, thereby erasing the soil indentations made by the tires of the agricultural equipment. Because the hinge allows the arm to pivot in a substantially vertical plane, the second end of the arm floats vertically, independent of the ground height of the equipment thereby allowing the second end of the eraser arm to engage the soil at a depth which is substantially determined by the weight of the arm and the forces experienced by the arm as the second end of the arm engages the soil.

In a preferred embodiment, the second end of the eraser arm includes a rake for engaging the soil and erasing the soil indentation. Preferably, the rake is generally arcuate.

In order to be able to transport the system of the present invention to and from the location of use, disengaging means are employed which disengage the second end of the eraser arm from the soil. In a preferred embodiment, the disengaging means includes an adjustable frame member which is attached to the equipment and adapted to be raised and lowered. In one embodiment, a chain is connected between the adjustable frame and the eraser arm. When the adjustable frame is raised and lowered, the chain is also raised and lowered and, accordingly, acts upon the eraser arm to sufficiently pivot the arm about the hinge to ensure that the second end of the arm is fully disengaged from the soil during transport. Once the equipment is ready for use, the adjustable frame member is lowered, thereby engaging the second end of the arm with the soil. During operation, the chain is left slack leaving the eraser arm to float at a depth determined primarily by the weight of the arm and the forces experienced by the arm as the second end engages the soil.

In an alternative embodiment, the chain is replaced by a bracket having a slotted opening therein and the adjustable frame is fitted with a limit pin which is adapted to fit freely within the slot. The limit pin extends from the frame and the bracket is fixed to the eraser arm in a way which allows the pin to engage the slot. When the track erasers are being used, the pin floats freely within the slot leaving the second end of the arm to float freely at a cutting depth determined primarily by the weight of the arm and the forces experienced by the arm as the second end engages the soil. When the adjustable frame is lifted, the pin contacts the end of the slot thereby raising the eraser arm. This lifting action disengages the second end of the eraser arm from the soil thereby placing it in a position suited for transporting.

Other advantages and meritorious features of the present invention will become fully understood from the following description of the preferred embodiments, the appended claims and the drawings, a brief description of which follows.

BRIEF DESCRIPTION OF THE DRAWINGS

FIG. 1 is a side elevational view of a tractor pulling an agricultural implement which employs the flying track eraser of the present invention.

FIG. 2 is a side elevational view of a first embodiment of the present invention showing the eraser arm in the soil engaging position.

DETAILED DESCRIPTION OF THE PREFERRED EMBODIMENTS

Figure 3:
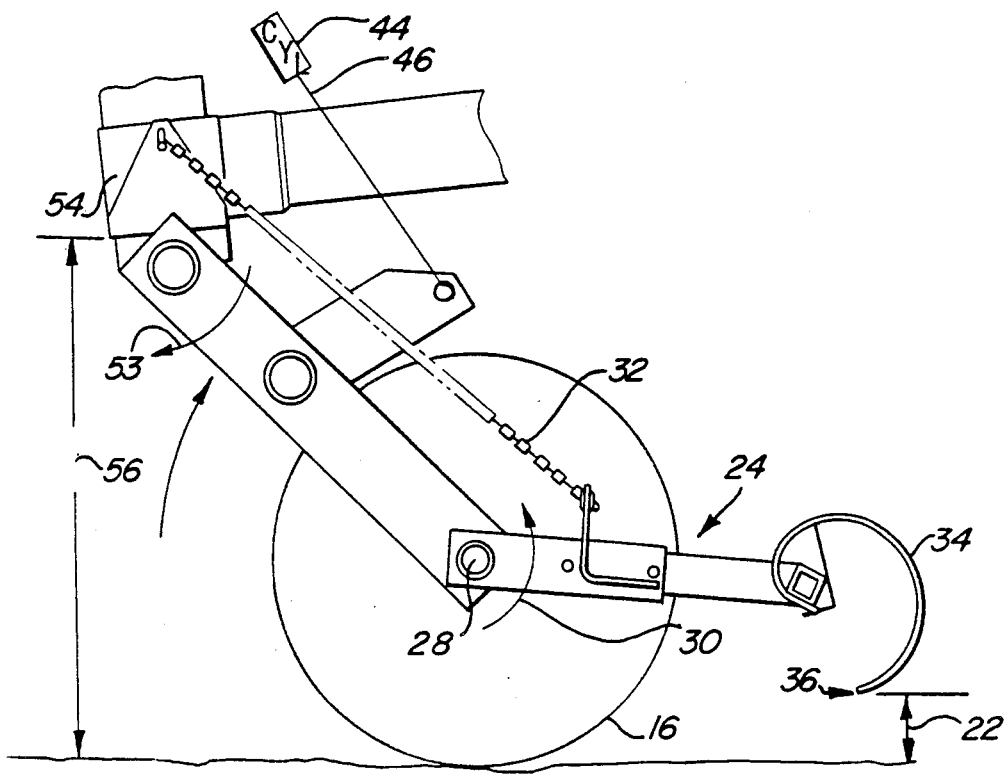
FIG. 3 is a side elevational view of the first embodiment of the present invention showing the eraser arm in the transport position.

Now referring to the drawing of FIG. 1, tractor 10 pulls an agricultural implement 12, such as a seeder or the like. Agricultural implement 12 typically includes frame 14 which is supported by one or more frame support wheels 16.

The majority of the weight of agricultural implement 12 is typically borne by wheels 16 and, accordingly, this weight tends to cause wheels 16 to leave a track or indentation in the surface of soil 18. Floating track erasers 20 are adapted to be pulled behind wheel 16 and engage the track left thereby in a way which removes the track.

When agricultural implement 12 is transported to and from its location of use, floating track erasers 20 can be lifted above ground level 22, thereby disengaging floating track erasers 20 from the soil. Although the details of a single floating track eraser 20 will now be discussed in conjunction with the remaining drawings, it is to be understood that in agricultural equipment 12 using a plurality of wheels 16, multiple floating track erasers 20 can be employed with each floating track eraser respectively associated with one of the plurality of wheels 16. This one-to-one arrangement allows each floating track eraser to erase the track left by its respectively associated wheel.

Now referring to the drawing of FIG. 2, floating track eraser 20 is comprised of eraser arm 24 and agricultural equipment frame 26. Hinge 28 is disposed between frame 26 and arm 24 for allowing arm 24 to pivot in a substantially vertical plane 30. Rake 34 is attached to arm 24 at an end opposite to that of hinge 28. Rake 34 is preferably generally arcuate in shape and has free end 36 which is adapted to engage soil 18 and remove the indentations placed therein by wheel 16.

Hinge 28 ensures that free end 36 of rake 34 is not forced into the ground, but rather is allowed to float at a soil depth 38 which is primarily determined by the weight of arm 24, the consistency of soil 18 and the forces experienced by rake 34 as free end 36 is dragged behind wheel 16. It is important to note that this ability of arm 24 to float behind frame 26 is an important aspect of the present invention. For example, as wheel 16 traverses a high spot or a low spot in the terrain, frame 26 will correspondingly track the upward or downward motion of wheel 16; however, because arm 24 is free to pivot about hinge 28, it is not forced upward or downward by the movement of wheel 16. Consequently, depth 38 is largely independent of the ground height 56 of frame 26 and is in turn dependent upon arm 24 weight, soil 18 consistency and rake 34 geometry—all of which are fixed in a given application, thereby resulting in a fixed depth 38.

Now referring to the drawings of FIG. 2 and FIG. 3, under normal operation of eraser arm 24, chain 32 is slack 40, thereby introducing no substantial force on bracket 42. Accordingly, during the erasing action of rake 34, chain 32 has minimal effect, if any, on the depth 38 of free end 36. When use of the implement 12 is completed and it is desired to place arm 24 in a transport position, whereby rake 34 is disengaged from soil 18, cylinder 44 is pressurized with air, hydraulic fluid or the like, thereby exerting a force against frame bracket 48 through cylinder arm 44. Frame bracket 48 is attached to frame 26 at point 50. This attachment is made by way of welding or the like, such that bracket 48 is fixedly attached to frame 26. This arrangement of cylinder 44, bracket 48 and frame 26 act to pivot 53 frame 26 about pivot joint 52 to lower and raise upper frame 54. As arm 46 of cylinder 44 extends, upper frame 54 is elevated and chain 32 becomes taut 40'. Additional extension of arm 46 of cylinder 44 beyond this point 40' begins to pull on bracket 42 such that arm 24 pivots upwardly in vertical plane 30. This pivotal action of arm 24 lifts free end 36 of rake 34 from ground 18 and deploys it in an elevated position.

Once arm 46 of cylinder 44 is in its fully extended position, upper frame 54 is elevated to its greatest height 56. At this most elevated height 56, chain 32 has acted on arm 24 causing it to rotate about hinge 28 to an extent which ensures that free end 36 of rake 34 is spaced apart from soil top surface 22. In this position, agricultural equipment 12 is ready to be transported.

Figure 4:
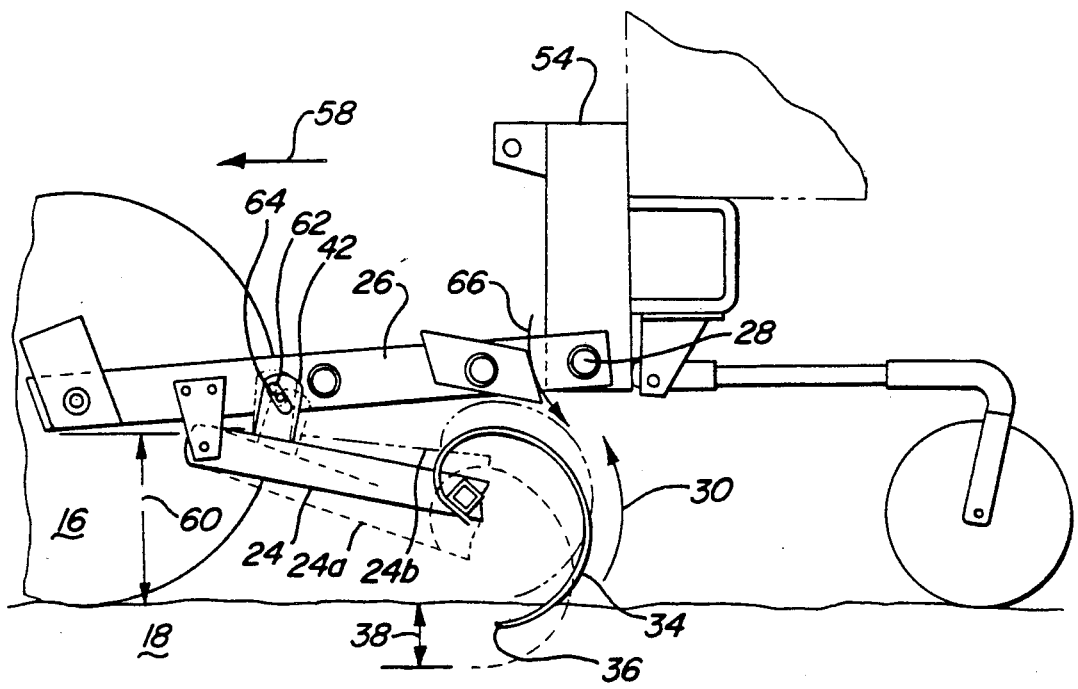
FIG. 4 is a side elevational view of a second embodiment of the present invention showing the eraser arm in the soil engaging position.

Now referring to the drawing of FIG. 4, in a second embodiment of the floating track eraser of the present invention, frame 26 pushes wheel 16 in a forward direction 58. Like the embodiment disclosed in FIGS. 1, 2 and 3, arm 24 is free to float in a substantially vertical plane 30 thereby allowing free end 36 of rake 34 to cut through soil 18 at a depth 38 which is independent of height 60 of frame 26.

Arm 24 is fitted with bracket 42. Bracket 42 has slot 62 cut therein and is adapted to loosely fit over pivot pin 64. Pivot pin 64 is fixed at one end to frame 26 and left free at an opposite end. As can be seen from the drawing of FIG. 4, during normal operation of eraser arm 24, arm 24 is free to swing throughout range 24a through 24b (determined by the length of slot 62). Under normal operating conditions, pin 64 floats within slot 62 and does not affect height 38 of free end 36 of rake 34. This height 38 is, as has been explained with the embodiment shown at FIGS. 2 and 3, mainly determined by the weight of arm 24, the consistency of soil 18 and the forces which act upon free end 36 as it is pulled through soil 18.

Figure 5:
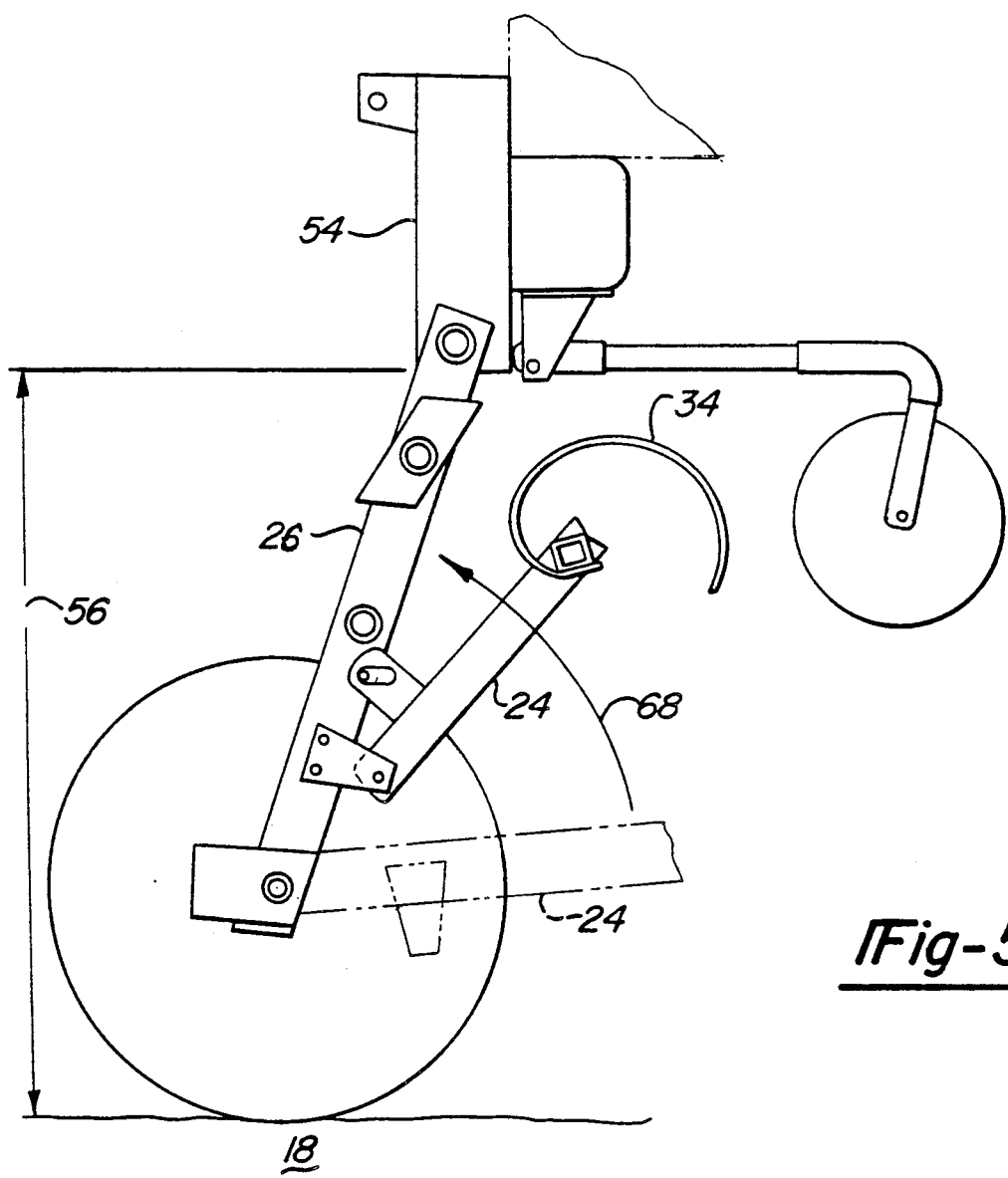
FIG. 5 is a side elevational view of the present invention showing the eraser arm in the transport position.

Now referring to the drawings of FIGS. 4 and 5, as frame 54 is raised (by any number of cylinder arrangements well known to those skilled in the art such as that used in conjunction with the first embodiment shown in FIG. 2 and FIG. 3) frame 26 swings downwardly 66 about pivot point 28. As this downward motion continues, pivot pin 64 eventually contacts one end of slot 62 of bracket 42 and any further pivotal motion 66 of frame 26 will begin to lift rake 34 from soil 18.

As upper frame 54 is lifted to its highest position, distance 56 increases to a maximum point. At this maximum point, rake 34 is fully disengaged from soil 18 thereby standing ready to be transported. As upper frame 54 is lifted from the operational position shown in FIG. 4 to the transport position shown in FIG. 5, eraser arm 24 follows the course of movement shown by arc shown at 68.

Thus, the embodiments of the improved track erasers of this invention shown in FIGS. 1 to 3 and FIGS. 4 and 5 differ primarily in the means for raising or lowering the eraser rake 34 to and from the transport position. It should also be noted that the disclosed means also has the additional function of limiting the penetration of the rake 34. In the embodiment shown in FIGS. 1 to 3, the chain 40 permits the eraser rake 34 to float essentially unhindered by the assembly. The chain 40 does, however, limit the penetration of the rake. Similarly, the slot 62 of bracket 42 limits the penetration of the rake in the embodiment disclosed in FIGS. 4 and 5. As described, the configuration of the rake 34 and its resiliency also is a factor in determining the penetration of the rake. In the preferred embodiment, the rake 34 is formed of a resilient metal, preferably steel.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. For example, the floating track erasers can be adapted to be used on any type of agricultural equipment and accordingly, are not limited to devices which typically employ track erasers such as seeders and the like. It is also important to note that although an arcuate rake configuration has been chosen here to illustrate one embodiment of the present invention, different ground engaging geometries may be used on free end 36 of rake 34 to accomplish optimum results for a given soil condition. Accordingly, it is to be understood that the subject matter sought to be afforded hereby should be deemed to extend to the subject matter defined in the appended claims, including all fair equivalents thereof.

I claim:

1. A system for uniformly erasing soil indentations made by agricultural equipment, comprising:

a hinge having a first and second end, said first end attached to said equipment, an eraser arm having a first and second end, said first end of said arm attached to said second end of said hinge and said second end of said arm adapted for pulling behind said equipment and engaging and erasing said soil indentations made by said equipment, wherein said hinge is adapted to pivot said arm in a substantially vertical plane thereby allowing said second end of said arm to float vertically, independent of the height of said equipment, said second end of said arm engaging said soil at a depth which is substantially determined by the weight of said arm and the forces experienced by said arm as said second end engages said soil, said equipment further including means for disengaging said second end of said arm from said soil, said disengaging means permitting said system to be transported to and from a site without dragging said eraser arm, and wherein said disengaging means includes a chain and an adjustable frame member, said adjustable frame member attached to said equipment and adapted to be raised and lowered, said chain connected between said adjustable frame member and said eraser arm, wherein said raising and lowering of said adjustable frame member acts upon said chain to raise and lower said arm whereby said arm sufficiently pivots about said hinge to ensure that said second end of said arm is fully disengaged from said soil during transport and fully engaged with said soil during operation of said track eraser.

2. The soil indentation erasing system of claim 1, wherein said second end of said arm includes a rake for engaging said soil and erasing said soil indentation.

3. The soil indentation erasing system of claim 2, wherein said rake is generally arcuate.

4. A system for uniformly erasing soil indentations made by the wheels of agricultural equipment, comprising:

an implement having a hitch for pulling said implement behind a tractor, said implement having a frame and wheels attached to said frame for engaging said soil and supporting the weight of said implement, a hinge having a first and second end, said first end attached to said implement frame, an eraser arm having a first and second end, said first end of said arm attached to said second end of said hinge and said second end of said arm adapted for pulling behind said implement and engaging and erasing said soil indentations made by said wheels of said implement, wherein said hinge is adapted to pivot said arm in a substantially vertical plane thereby allowing said second end of said arm to float vertically, independent of the height of said implement frame, said second end of said arm engaging said soil at a depth which is substantially determined by the weight of said arm and the forces experienced by said arm as said second end engages said soil, said implement frame further including means for disengaging said second end of said arm from said soil, said disengaging means permitting said system to be transported to and from a site without dragging said eraser arm, and wherein said disengaging means includes a chain and an adjustable frame member, said adjustable frame member attached to said implement frame and adapted to be raised and lowered, said chain connected between said adjustable frame member and said eraser arm, wherein said raising and lowering of said adjustable frame member acts through said chain onto said arm to raise and lower said arm whereby said arm sufficiently pivots about said hinge to ensure that said second end of said arm is fully disengaged from said soil during transport and fully engaged with said soil during operation of said track eraser.

5. The soil indentation erasing system of claim 4, wherein said second end of said arm includes a rake for engaging said soil and erasing said soil indentation.

6. The soil indentation erasing system of claim 5, wherein said rake is generally arcuate.

7. A system for uniformly erasing soil indentations made by agricultural equipment, comprising:

a hinge having a first and second end, said first end attached to said equipment, an eraser arm having a first and second end, said first end of said arm attached to said second end of said hinge and said second end of said arm adapted for pulling behind said equipment and engaging and erasing said soil indentations made by said equipment, wherein said hinge is adapted to pivot said arm in a substantially vertical plane thereby allowing said second end of said arm to float vertically, independent of the height of said equipment, said second end of said arm engaging said soil at a depth which is substantially determined by the weight of said arm and the forces experienced by said arm as said second end engages said soil, said equipment further including means for disengaging said second end of said arm from said soil, said disengaging means permitting said system to be transported to and from a site without dragging said eraser arm, and wherein said disengaging means includes a bracket having a slotted opening therein, a limit pin adapted to freely fit within said slot and an adjustable frame member attached to said equipment adapted to be raised and lowered, said bracket being attached to said arm between said first and second ends of said arm, said limit pin being attached to said adjustable frame and extending through said slot, whereby raising and lowering of said adjustable frame member acts upon said bracket to raise and lower said arm whereby said arm sufficiently pivots about said hinge to ensure that said second end of said arm is fully disengaged from said soil when said adjustable frame is raised during transport and fully engaged with said soil when said adjustable frame is lowered during operation of said track eraser.

8. The soil indentation erasing system of claim 7, wherein said second end of said arm includes a rake for engaging said soil and erasing said soil indentation.

9. The soil indentation erasing system of claim 8, wherein said rake is generally arcuate.

10. A system for uniformly erasing soil indentations made by the wheels of agricultural equipment, comprising:

an implement having a hitch for pulling said implement behind a tractor, said implement having a frame and wheels attached to said frame for engaging said soil and supporting the weight of said implement, a hinge having a first and second end, said first end attached to said implement frame, an eraser arm having a first and second end, said first end of said arm attached to said second end of said hinge and said second end of said arm adapted for pulling behind said implement and engaging and erasing said soil indentations made by said wheels of said implement, wherein said hinge is adapted to pivot said arm in a substantially vertical plane thereby allowing said second end of said arm to float vertically, independent of the height of said implement frame, said second end of said arm engaging said soil at a depth which is substantially determined by the weight of said arm and the forces experienced by said arm as said second end engages said soil, said implement frame further including means for disengaging said second end of said arm from said soil, said disengaging means permitting said system to be transported to and from a site without dragging said eraser arm, and wherein said disengaging means includes a bracket having a slotted opening therein, a limit pin adapted to freely fit within said slot and an adjustable frame member attached to said implement frame adapted to be raised and lowered, said bracket being attached to said arm between said first and second ends of said arm, said limit pin being attached to said adjustable frame and extending through said slot, whereby raising and lowering of said adjustable frame member acts through said pin upon said bracket to raise and lower said arm whereby said arm sufficiently pivots about said hinge to ensure that said second end of said arm is fully disengaged from said soil when said adjustable frame is raised during transport and fully engaged with said soil when said adjustable frame is lowered during operation of said track eraser.

11. The soil indentation erasing system of claim 10, wherein said second end of said arm includes a rake for engaging said soil and erasing said soil indentation.

12. The soil indentation erasing system of claim 11, wherein said rake is generally arcuate.

* * * * *